United States Patent
Cheng

(10) Patent No.: US 11,493,589 B2
(45) Date of Patent: Nov. 8, 2022

(54) POSITIONING TAG OPERATION METHOD AND POSITIONING SYSTEM OPERATION METHOD

(71) Applicant: Sercomm Corporation, Taipei (TW)

(72) Inventor: Lin Cheng, Suzhou (CN)

(73) Assignee: SERCOMM CORPORATION, Taipei (TW)

( * ) Notice: Subject to any disclaimer, the term of this patent is extended or adjusted under 35 U.S.C. 154(b) by 59 days.

(21) Appl. No.: 17/335,113

(22) Filed: Jun. 1, 2021

(65) Prior Publication Data

US 2022/0091222 A1 Mar. 24, 2022

(30) Foreign Application Priority Data

Sep. 18, 2020 (CN) .......................... 202010990199.2

(51) Int. Cl.
*G01S 5/06* (2006.01)
*G01S 5/02* (2010.01)

(52) U.S. Cl.
CPC ........ *G01S 5/02216* (2020.05); *G01S 5/0226* (2013.01); *G01S 5/06* (2013.01)

(58) Field of Classification Search
CPC ....... G01S 5/02216; G01S 5/0226; G01S 5/06
USPC ........................................................ 342/451
See application file for complete search history.

(56) References Cited

U.S. PATENT DOCUMENTS

| 6,876,859 | B2 | 4/2005 | Anderson et al. | |
|---|---|---|---|---|
| 10,397,801 | B2 | 8/2019 | Chrabieh | |
| 2012/0133487 | A1* | 5/2012 | Murofushi | G01S 13/878 340/10.5 |

(Continued)

FOREIGN PATENT DOCUMENTS

| CN | 104159291 A | 11/2014 |
|---|---|---|
| CN | 108112070 A | 6/2018 |
| CN | 110011748 A | 7/2019 |

(Continued)

OTHER PUBLICATIONS

Lin Cheng et al, "Ultra-wideband (UWB) positioning system, base station, tag and operation methods thereof", U.S. Appl. No. 17/068,038, filed Oct. 12, 2020.

*Primary Examiner* — Harry K Liu
(74) *Attorney, Agent, or Firm* — WPAT, PC

(57) ABSTRACT

The present invention discloses a positioning tag operation method includes the steps outlined below. The positioning tag is set in an initializing state to select an available positioning time interval within each positioning periods as a selected positioning time interval and broadcast a connection request signal therein. A time synchronization signal is received from a base station of the positioning system. The time synchronization signal includes information of an assigned positioning time interval corresponding to the positioning tag within each of the positioning periods is determined by the positioning tag, so as to set the positioning tag in a positioning state accordingly and stop receiving the time synchronization signal. The positioning signal is broadcasted in the assigned positioning time interval within each of the positioning periods in the positioning state, and the positioning signal is stopped to be broadcasted in the time other than the assigned positioning time interval within each of the positioning periods.

10 Claims, 7 Drawing Sheets

(56) References Cited

U.S. PATENT DOCUMENTS

2020/0205115 A1\* 6/2020 Zhao .................. H04W 64/003

FOREIGN PATENT DOCUMENTS

| CN | 107182123 | B |   | 8/2019 |
|----|-----------|---|---|--------|
| CN | 110113788 | A | * | 8/2019 |
| CN | 110234063 | A |   | 9/2019 |
| CN | 109547146 | B |   | 1/2020 |
| CN | 110662287 | A |   | 1/2020 |
| CN | 107257579 | B |   | 2/2020 |
| CN | 110807341 | A |   | 2/2020 |
| CN | 107835491 | B |   | 4/2020 |
| CN | 110958576 | A |   | 4/2020 |
| CN | 110996281 | A |   | 4/2020 |
| CN | 111107622 | A |   | 5/2020 |

\* cited by examiner

POSITIONING TAG OPERATION METHOD AND POSITIONING SYSTEM OPERATION METHOD

BACKGROUND OF THE INVENTION

1. Field of the Invention

The present invention relates to a positioning tag operation method and a positioning system operation method.

2. Description of Related Art

A common positioning system may use a multiple of base stations (BS), which can be called nodes or anchors, to measure distances from each of a multiple of tags and further calculate the position of each of the tags in a three-dimensional space. Under such a condition, coordinating the communication time procedure among the base stations and the tags is very important. A good coordination can avoid the occurrence of conflict such that the position system becomes more stable. However, when the number of the positioning tags increases, the conflict is easier to be generated among different positioning tags. If an efficient resolving mechanism is absent, the positioning tags can not be aware of the occurrence of the conflict such that the conflict can not be resolved.

SUMMARY OF THE INVENTION

In consideration of the problem of the prior art, an object of the present invention is to supply a positioning tag operation method and a positioning system operation method.

The present invention discloses a positioning tag operation method used in a positioning tag included in a positioning system that includes the steps outlined below, wherein the positioning system operates according to positioning periods. The positioning tag is set in an initializing state, so as to select an available positioning time interval within each of the positioning periods as a selected positioning time interval and broadcast a connection request signal in the selected positioning time interval. A time synchronization signal is received from at lease one base station of the positioning system by the positioning tag. The time synchronization signal includes information of an assigned positioning time interval within each of the positioning periods, and the assigned positioning time interval corresponds to the positioning tag is determined by the positioning tag, so as to set the positioning tag in a positioning state according to the assigned positioning time interval and stop receiving the time synchronization signal. A positioning signal is broadcasted in the assigned positioning time interval within each of the positioning periods by the positioning tag in the positioning state, and the positioning signal is stopped to be broadcasted in the time other than the assigned positioning time interval within each of the positioning periods.

The present invention also discloses a positioning system operation method used in a positioning system that includes the steps outlined below, wherein the positioning system operates according to positioning periods and includes a plurality of base stations, a positioning tag and a positioning server. The base stations are synchronized according to a time synchronization signal transmitted and received in each of the positioning periods among the base station. The positioning tag is set in an initializing state, so as to select an available positioning time interval within each of the positioning periods as a selected positioning time interval and broadcast a connection request signal in the selected positioning time interval. The time synchronization signal is received from at lease one of the base stations of the positioning system by the positioning tag. The time synchronization signal includes information of an assigned positioning time interval within each of the positioning periods and the assigned positioning time interval corresponds to the positioning tag is determined by the positioning tag, so as to set the positioning tag in a positioning state according to the assigned positioning time interval and stop receiving the time synchronization signal. A positioning signal is broadcasted in the assigned positioning time interval within each of the positioning periods, and the positioning signal is stopped to be broadcasted in the time other than the assigned positioning time interval within each of the positioning periods by the positioning tag in the positioning state. The positioning signal is received by the base stations to generate time information respectively. The time information is received and a position of the positioning tag is calculated accordingly by the positioning server.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a positioning tag operation method and a positioning system operation method.

Figure 1:
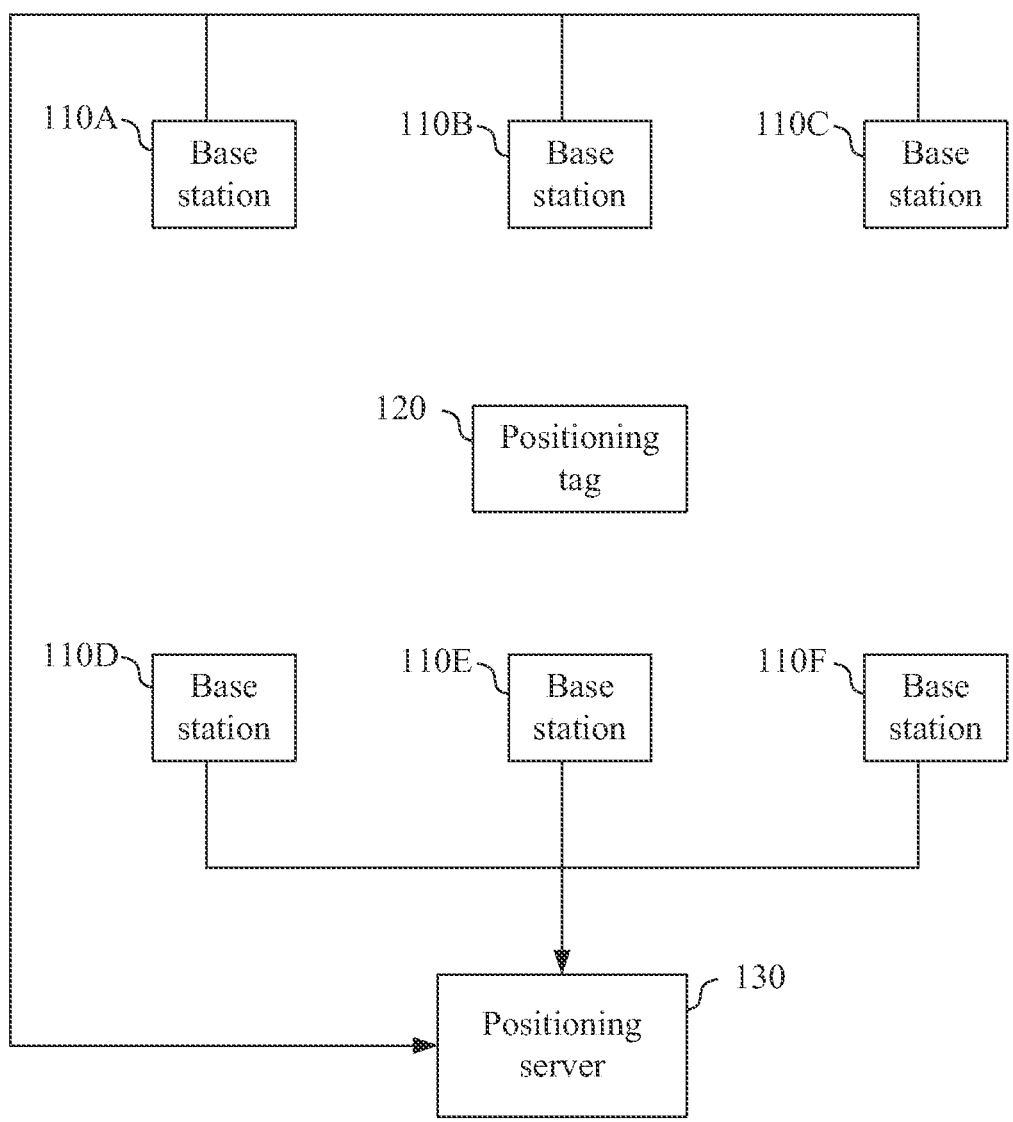
FIG. 1 illustrates a diagram of a positioning system according to an embodiment of the present invention.

Reference is now made to FIG. 1. FIG. 1 illustrates a diagram of a positioning system 100 according to an embodiment of the present invention. The positioning system 100 includes base stations 110A~110F, a positioning tag 120 and a positioning server 130. Each of the base stations 110A~110F, the positioning tag 120 and the positioning server 130 may respectively include components, such as a communication circuit, a storage circuit and a processing circuit, to execute software and/or firmware stored therein by using these components to accomplish the object of communication, data storage and data processing.

The positioning system 100 operates according to positioning periods. The base stations 110A~110F can synchronize with each other within each of the positioning periods. Further, in each of the positioning periods, the positioning tag 120 can broadcast a wireless signal such that the base stations 110A~110F receive the wireless signal and obtain information related to the receiving time of the wireless signal. In an embodiment, the wireless communication between the base stations 110A~110F and the positioning tag 120 is performed by using ultra-wideband (UWB) technology such that the positioning system 100 based on the UWB technology can be implemented. The base stations 110A~110F can also use the ultra-wideband technology to perform communication and/or synchronization with each other.

The base stations 110A~110F further transmit the information related to the receiving time to the positioning server 130. The communication between the base stations 110A~110F and the positioning server 130 can be performed by using a wired method or a wireless method. The positioning server 130 calculates the position of the positioning tag 120 according to the information related to the time and the relevant locations of the base stations 110A~110F.

Figure 2:
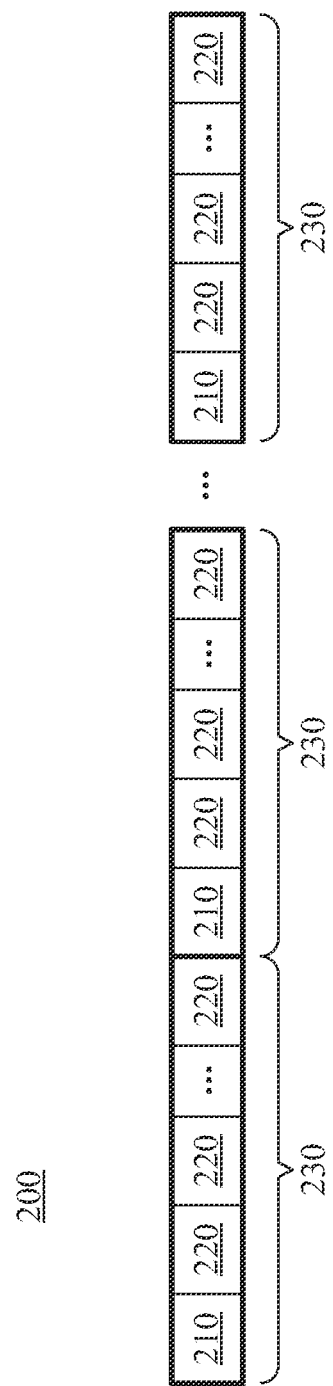
FIG. 2 illustrates the positioning periods that the positioning system operates accordingly according to an embodiment of the present invention.

FIG. 2 illustrates the positioning periods 200 that the positioning system 100 operates accordingly according to an embodiment of the present invention. Each of the positioning periods 200 includes a plurality of time intervals. The time intervals include synchronizing time intervals 210 and positioning time intervals 220. In an embodiment, the synchronizing time intervals 210 and the positioning time intervals 220 can be grouped as a plurality of positioning groups 230. Each of the positioning groups 230 includes one synchronizing time interval 210 and a multiple of positioning time intervals 220. The base stations 110A~110F can transmit the time synchronization signal in the synchronizing time interval 210 and the positioning tag 120 can broadcast the wireless signal in an assigned one of the positioning time intervals 220 to perform positioning.

Each of the synchronizing time intervals 210 and the positioning time intervals 220 within each of the positioning period 200 has unique identification information. However, the time length of the synchronizing time intervals 210 and the positioning time intervals 220 may not be the same. For example, the time length of each of the positioning period 200 is 1 second and is divided into 10 positioning groups 230 each having a time length of 100 milliseconds. Each of the positioning groups 230 includes one synchronizing time interval 210 and 198 positioning time intervals 220, in which the time length of the synchronizing time interval 210 is 1 millisecond and the time length of each of the positioning time interval 220 is 0.5 milliseconds. Theoretically, the positioning system 100 in such an example can support at most 1980 positioning tags 120 each having a positioning frequency of 1 Hertz (Hz). If the positioning system 100 is distributed in a plurality of areas that do not interfere with each other, e.g. positioning signal crossing areas, each of the areas can support at most 1980 positioning tags 120 theoretically.

Figure 3:
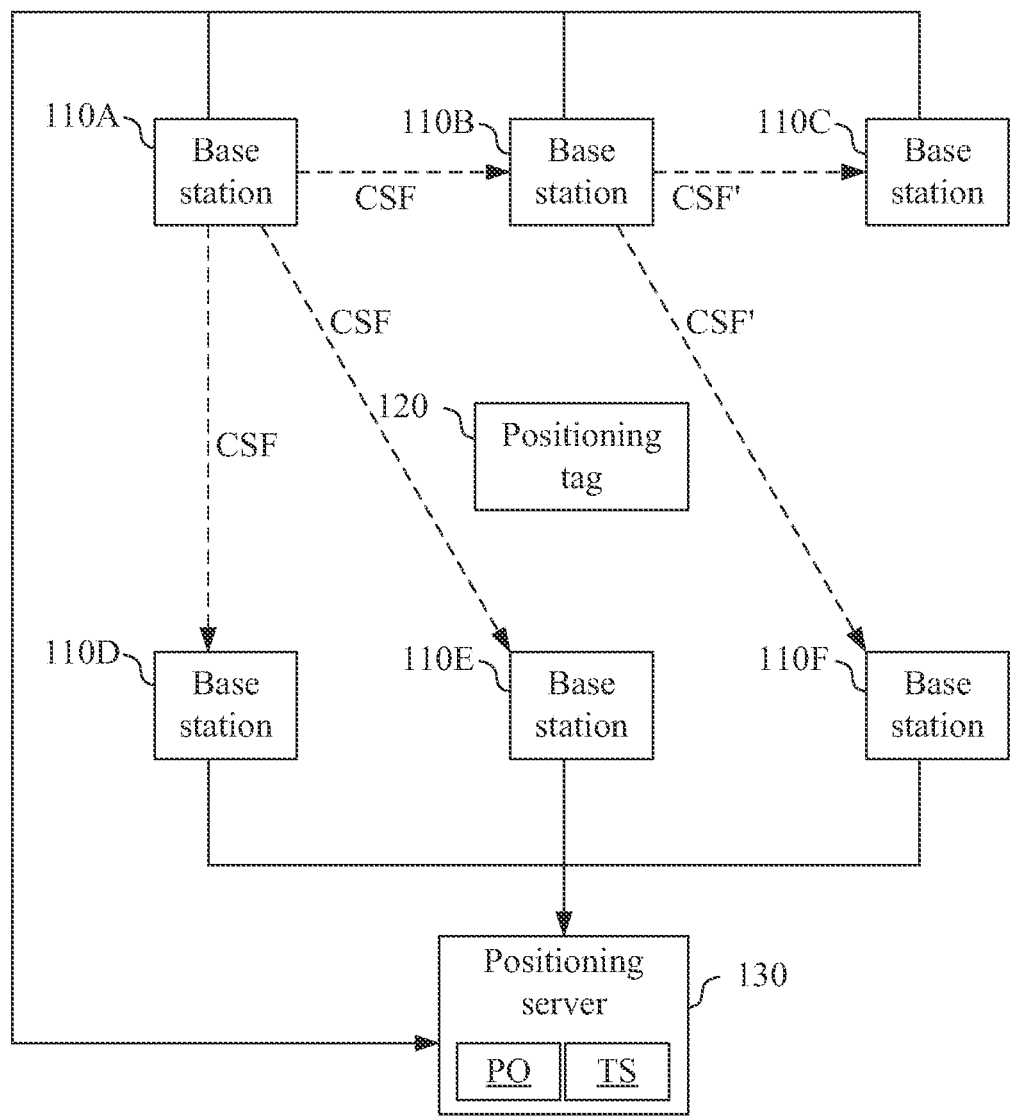
FIG. 3 illustrates a diagram of the positioning system operates in the synchronizing time interval according to an embodiment of the present invention.

FIG. 3 illustrates a diagram of the positioning system 100 operates in the synchronizing time interval 210 according to an embodiment of the present invention. In the synchronizing time interval 210, the base stations 110A~110F transmit and receive a time synchronization signal CSF such that the base stations 110A~110F can synchronize with each other, and the positioning tag 120 can synchronize with the base stations 110A~110F at the same time. The time synchronization signal CSF can be generated by at least one of the base stations 110A~110F. Different base stations 110A~110F may transmit the time synchronization signal CSF in different synchronizing time intervals 210. Some of the base stations 110A~110F may transmit the time synchronization signal CSF in the same synchronizing time interval 210 when these base stations 110A~110F are distanced from each other far enough without interfering with each other.

The base stations 110A~110F include master base stations and slave base stations. The master base stations transmit the time synchronization signal CSF in the synchronizing time intervals 210 such that the neighboring slave base stations receive the time synchronization signal CSF to perform synchronization. For example, the base station 110A serves as the master base station and transmits the time synchronization signal CSF to the base stations 110B, 110D and 110E such that these slave base stations synchronize with the base station 110A. In a positioning system 100 that covers a larger area, some of the slave base stations serve as secondary master base stations. More specifically, the secondary master base stations serve as the slave base station of the master base stations to receive the time synchronization signal CSF from the master base stations in one of the synchronizing time intervals 210 to perform synchronization. The secondary master base stations also serve as the master base stations of the other slave base stations to transmit the time synchronization signal CSF' in another one of the synchronizing time intervals 210 such that the neighboring slave base stations receive the time synchronization signal CSF' to perform synchronization. For example, the base station 110B serves as the secondary master base station and transmits the time synchronization signal CSF' to the base stations 110C and 110F such that these slave base stations synchronize with the base station 110B. When there are more base stations in the system, part of the base stations can serve as the tertiary master base stations.

In an embodiment, when the slave base stations receive the time synchronization signal CSF, the slave base stations record the time information and transmit the time information to the positioning server 130. The time information includes such as the transmission time of the time synchronization signal CSF transmitted from the master base stations (that can be included in the time synchronization signal CSF) and the receiving time of the time synchronization signal CSF received by the slave base stations. The positioning server 130 stores the position information PO of each of the base stations 110A~110F. Therefore, the distance between each two of the base stations 110A~110F is known. The positioning server 130 can calculate the time of flight of the time synchronization signal CSF according to the position information PO. For the time synchronization signal CSF transmitted between a pair of master base station and slave base station, the transmission time is T1, the receiving time is T2 and the time of flight is TOF. The positioning server 130 can calculate the time difference TD based on the following equation:

$$TD = T2 - T1 - TOF$$

As a result, the positioning server 130 can calculate the time difference between each two of the base stations 110A~110F according to the transmission of the time synchronization signal CSF and store the time differences as time difference information TS. The positioning server 130 can instruct the base stations 110A~110F to perform synchronization according to the time difference information TS, and use the position information PO and the time difference information TS to position the positioning tag 120.

Figure 4:
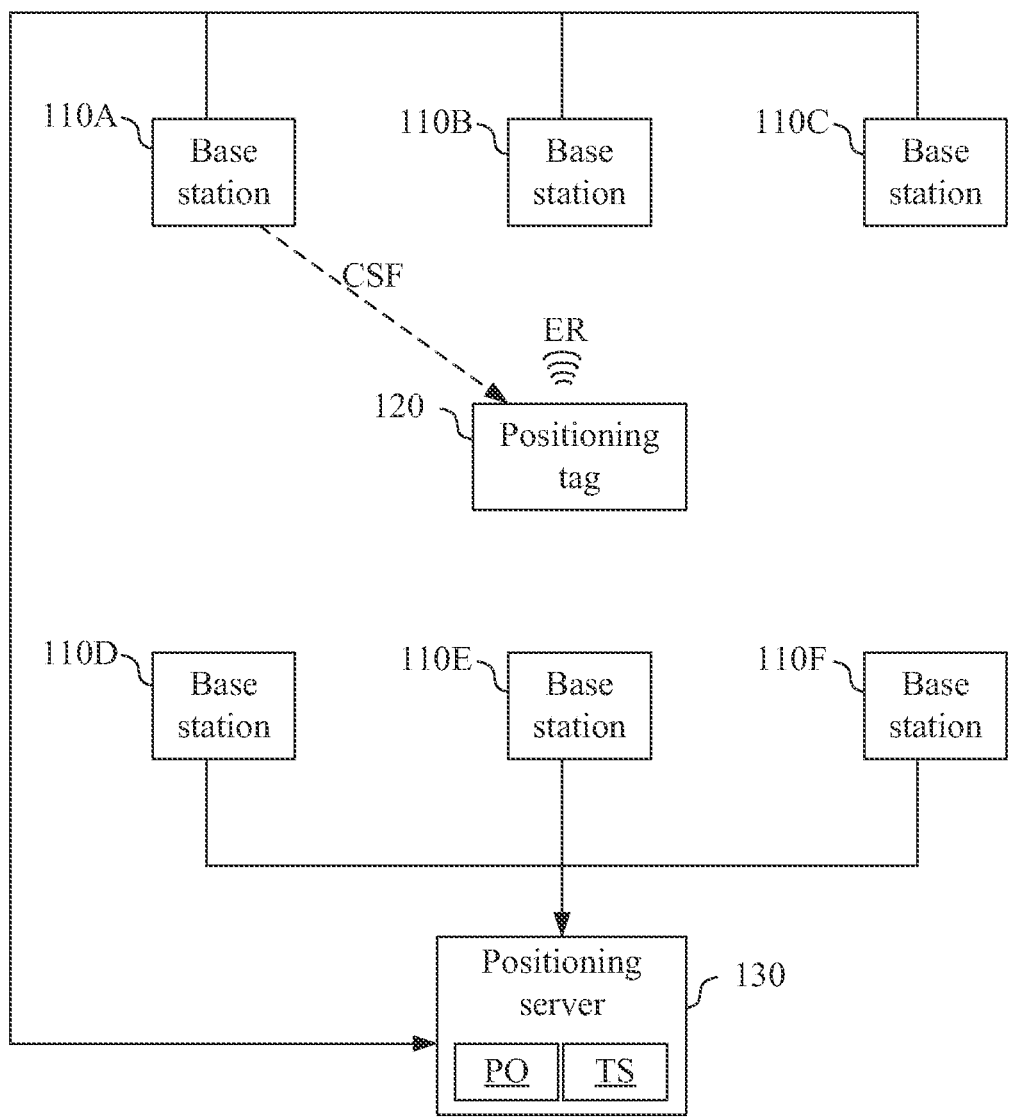
FIG. 4 illustrates a diagram of the positioning system under the condition that the positioning tag is set to be in the initializing state according to an embodiment of the present invention.

FIG. 4 illustrates a diagram of the positioning system 100 under the condition that the positioning tag 120 is set to be in the initializing state according to an embodiment of the present invention. The time synchronization signal CSF generated by the master base station described above (e.g. the base station 110A) can also be received by the positioning tag 120, such that the positioning tag 120 synchronizes with the base stations 110A~110F according to the time synchronization signal CSF. When the positioning tag 120 begins to operate, the positioning tag 120 is set to be in the initializing state and performs monitoring within the positioning period 200 to search for an available positioning time interval among the positioning time intervals 220. When any one of the positioning time intervals 220 in the positioning period 200 is assigned to a positioning tag, such a positioning time interval becomes an unavailable positioning time interval and is not able to be assigned to other positioning tags. When one of the positioning time intervals 220 is not assigned to any positioning tag, such a positioning time interval becomes an available positioning time interval that can be assigned.

The positioning tag 120 selects an available positioning time interval 220 in the positioning period 200 as a selected positioning time interval and broadcasts a connection request signal ER in the selected positioning time interval. In an embodiment, the content of the connection request signal ER includes such as the device identification information of the positioning tag 120 and the identification information of the selected positioning time interval 220. At least one of the base stations 110A~110F receives the connection request signal ER and transfers the connection request signal ER to the positioning server 130, such that the positioning server 130 determines the assigned positioning time interval according to the selected positioning time interval. When the positioning server 130 determines that the selected positioning time interval is available, the positioning server 130 assigns the selected positioning time interval as the assigned positioning time interval. When the positioning server 130 determines that the selected positioning time interval is unavailable, the positioning server 130 selects another available positioning time interval 220 as the assigned positioning time interval. When the positioning server 130 determines that no available positioning time interval is presented, the positioning server 130 does not assign any positioning time interval.

At least one of the base stations 110A~110F generates the time synchronization signal CSF in the subsequent positioning periods 200 according to the processing of the positioning server 130, such that the positioning tag 120 receives the time synchronization signal CSF to determine whether the connection to the positioning system 100 is successfully established accordingly. Since the processing of the positioning server 130 described above takes time, the positioning tag 120 performs the determination according to the time synchronization signal CSF received after the connection request signal ER is broadcast for a predetermined system processing time. Such a predetermined time can be the time length of three positioning groups 230.

When the positioning server 130 does not assign any positioning time interval, or when the time synchronization signal CSF does not have capacity for the related information under the condition that the positioning server 130 assigns a positioning time interval, the time synchronization signal CSF generated by the base stations 110A~110F does not include the device identification information of the positioning tag 120. Under such a condition, the positioning tag 120 determines that the connection to the positioning system 100 fails to be established. The positioning tag 120 is set to be in the initializing state again and repeats the process of monitoring the positioning period 200 and broadcasting the connection request signal ER.

When the positioning server 130 determines that the available positioning time interval is presented and generates the assigned positioning time interval, and the time synchronization signal CSF has the capacity for the assignment information of the positioning time interval, the time synchronization signal CSF generated by the base stations 110A~110F includes the device identification information of the positioning tag 120 and the corresponding assigned positioning time interval. When the time synchronization signal CSF has the device identification information corresponding to the positioning tag 120 and the assigned positioning time interval in the time synchronization signal CSF corresponding to the positioning tag 120 is different from the selected positioning time interval, the positioning tag 120 selects the assigned positioning time interval as the selected positioning time to broadcast the connection request signal ER again such that the positioning server 130 performs processing according to the connection request signal ER transmitted through the base stations 110A~110F. After the connection request signal ER is broadcasted for a predetermined system processing time, the positioning tag 120 receives the time synchronization signal CSF from at least one of the base stations 110A~110F and performs the determination again.

When the time synchronization signal CSF included the device identification information of the positioning tag 120 and the assigned positioning time interval corresponding to the positioning tag 120 in the time synchronization signal CSF is the same as the selected positioning time interval, the positioning tag 120 is set to be in the positioning state.

Figure 5:
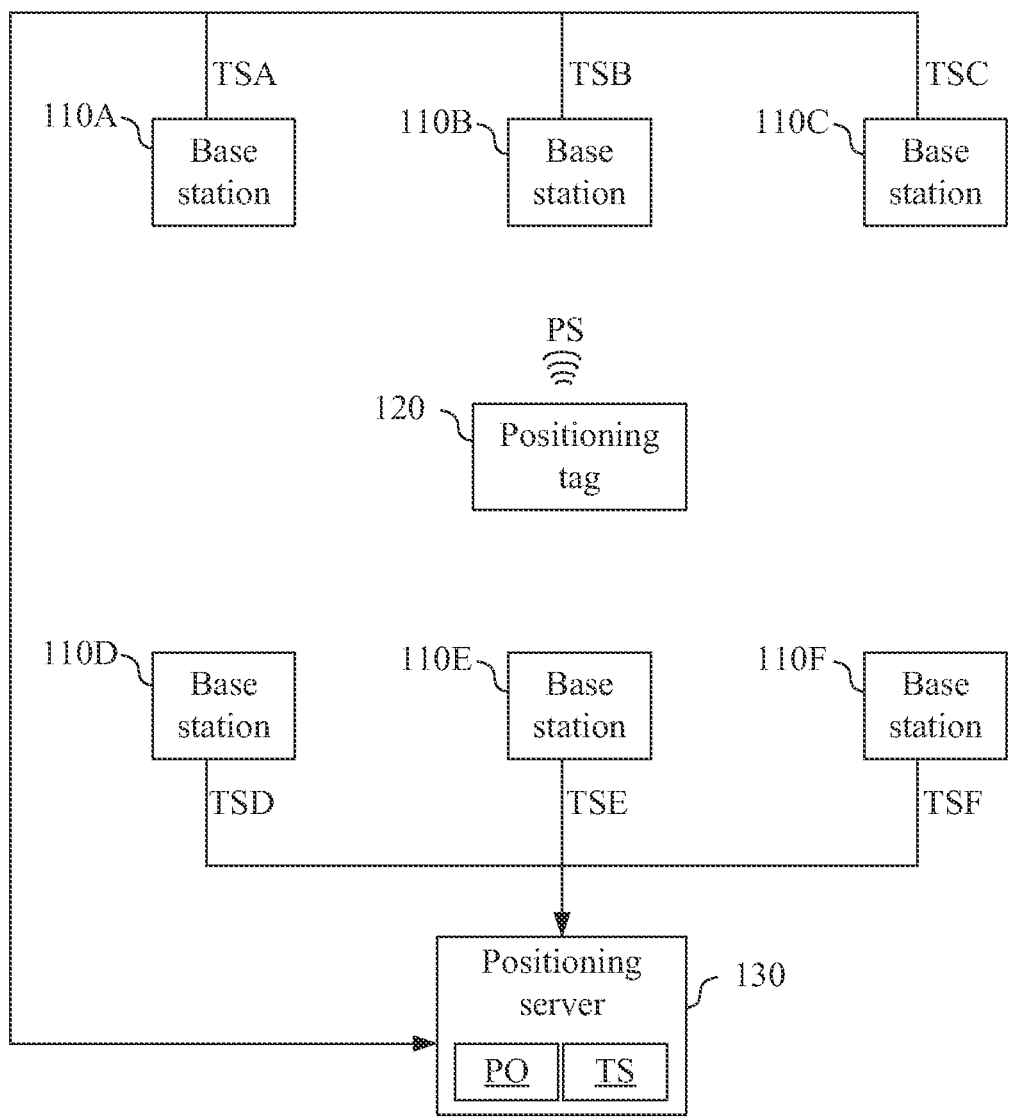
FIG. 5 illustrates a diagram of the positioning system under the condition that the positioning tag is set to be in the positioning state according to an embodiment of the present invention.

FIG. 5 illustrates a diagram of the positioning system 100 under the condition that the positioning tag 120 is set to be in the positioning state according to an embodiment of the present invention. In the positioning state, the positioning tag 120 broadcasts a positioning signal PS in the assigned positioning time interval within each of the positioning periods 200, and stops broadcasting the positioning signal PS in the time other than the assigned positioning time interval within the positioning period 200. Since the connection request signal ER broadcasted by the positioning tag 120 in the initializing state may have a timing difference from the timing of the assigned positioning time interval, the base stations 110A~110F can generate a timing fine-tuning value (not illustrated in the figure) according to the timing difference such that the positioning tag 120 receives the timing fine-tuning value. In an embodiment, the timing fine-tuning value can be transmitted by the base stations 110A~110F by using the time synchronization signal CSF when the positioning tag 120 is still in the initializing state.

The positioning tag 120 fine-tunes the transmission time of the positioning signal PS according to the timing fine-tuning value in the positioning state, so as to align the transmission time to the timing of the assigned positioning time interval. As a result, the positioning tag 120 can accurately broadcast the positioning signal PS in the assigned positioning time interval within each of the positioning periods 200 according to the fine-tuned transmission time.

The base stations 110A~110F receives the positioning signal PS and generates time information TSA~TSF accordingly. The time information TSA~TSF may include such as the device identification information of the positioning tag 120 and the time stamp when the base stations 110A~110F receive the positioning signal PS. The base stations 110A~110F further report the time information TSA~TSF to the positioning server 130. Obviously, no time information is generated and reported when the base stations do not receive the positioning signal PS. The positioning server 130 receives the time information TSA~TSF from the base stations 110A~110F. Since the positioning server 130 stores the position information PO of each of the base stations 110A~110F and the time difference information TS among the base stations 110A~110F, the positioning server 130 can calculate the position of the positioning tag 120 according to the time information TSA~TSF, the position information PO and the time difference information TS. The time difference of arrival (TDoA) is one method that can be used to calculate the position of the positioning tag 120.

In order to save power, the positioning tag 120 may be configured to receive the time synchronization signal CSF only in the initializing state and stop to receive the time synchronization signal CSF in the positioning state. However, the under the condition that the number of the positioning tag 120 in the system becomes larger, different positioning tags may be assigned to the same positioning time interval 220 such that a conflict occurs. However, such a conflict may not be resolved since the positioning tags stop to receive the time synchronization signal CSF in the positioning state. As a result, in an embodiment, the positioning tag 120 is set to be in the initializing state when a transmission number of the positioning signal PS exceeds a number threshold or when a time that the positioning tag 120 is in the positioning state exceeds a time threshold. By using such a mechanism, the positioning tag 120 can make sure whether the conflict occurs and resolve the conflict when the conflict occurs.

It is appreciated that the number of each of the devices in the positioning system 100 is not limited by the number illustrated in FIG. 1. For example, the number of the positioning tag 120 can be any positive integer as long as the system is able to support. The number of the base stations 110A~110F can be any positive integer that is three or over three. Further, the positioning server 130 can be disposed in any one of the base stations 110A~110F.

Figure 6:
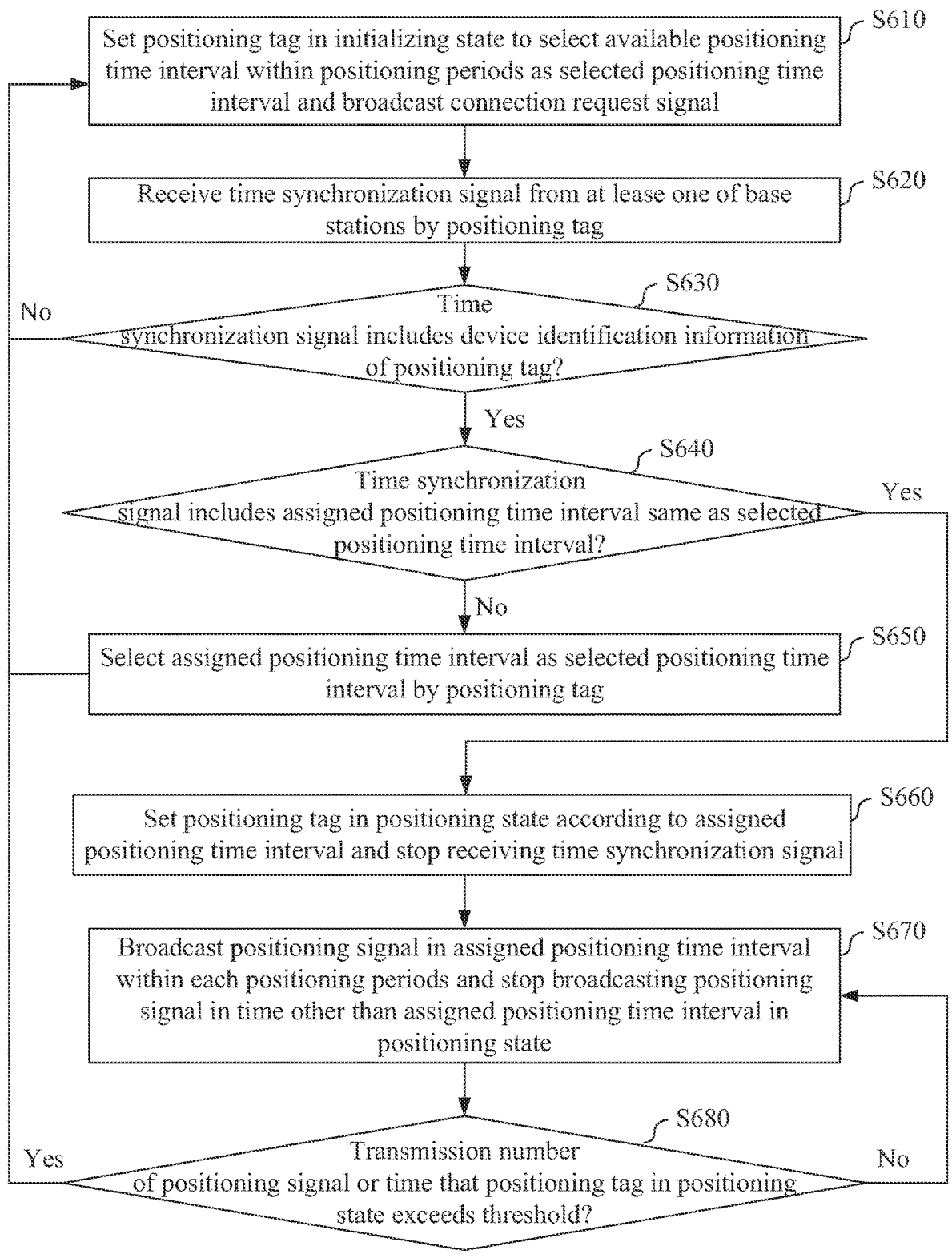
FIG. 6 illustrates a flow chart of a positioning tag operation method according to an embodiment of the present invention.

FIG. 6 illustrates a flow chart of a positioning tag operation method 600 according to an embodiment of the present invention. The positioning tag operation method 600 can be used in such as the positioning tag 120 in FIG. 1. The positioning tag operation method 600 includes the steps outlined below.

In step S610, the positioning tag 120 is set in the initializing state, so as to select the available positioning time interval within each of the positioning periods as the selected positioning time interval and broadcast the connection request signal ER in the selected positioning time interval. In an embodiment, when the positioning tag 120 begins to operate, the positioning tag 120 performs monitoring, e.g. for the whole positioning periods, to select the available positioning time interval as the selected positioning time interval. At least one of the base stations 110A~110F receives the connection request signal ER, transfers the connection request signal ER to the positioning server 130 to be processed and generates the time synchronization signal CSF in the subsequent positioning period 200 according to the processing of the positioning server 130.

In step S620, the time synchronization signal CSF is received from at lease one of the base stations 110A~110F by the positioning tag 120.

In step S630, whether the time synchronization signal CSF includes the device identification information of the positioning tag 120 is determined by the positioning tag 120. When the time synchronization signal CSF does not include the device identification information of the positioning tag 120, the positioning tag 120 determines that the connection to the positioning system 100 fails to be established. The flow goes back to step S610 such that the positioning tag 120 is set to be in the initializing state again.

In step S640, when the time synchronization signal CSF includes the device identification information of the positioning tag 120, whether the time synchronization signal CSF includes the assigned positioning time interval corresponding to the device identification information and is the same as the selected positioning time interval is determined by the positioning tag 120.

In step S650, when the assigned positioning time interval and the selected positioning time interval are different, the positioning tag 120 selects the assigned positioning time interval as the selected positioning time interval. The flow goes back to the step S610 such that the positioning tag 120 is set to be in the initializing state again to broadcast the connection request signal ER again according to the selected positioning time interval. Under such a condition, the positioning tag 120 is not required to monitor the whole positioning period 200.

In step S660, when the assigned positioning time interval and the selected positioning time interval are the same, the positioning tag 120 is set to be in the positioning state according to the assigned positioning time interval and stops receiving the time synchronization signal CSF to save power.

In step S670, the positioning signal PS is broadcasted in the assigned positioning time interval within each of the positioning periods by the positioning tag 120 in the positioning state, and the positioning signal PS is stopped to be broadcasted in the time other than the assigned positioning time interval within each of the positioning periods. As a result, the positioning tag 120 can enter a sleep mode in the time other than the assigned positioning time interval to stop receiving and transmitting the radio frequency (RF) signal related to the positioning system 100 to save power.

In step S680, whether the transmission number of the positioning signal PS exceeds the number threshold or whether the time that the positioning tag 120 is in the positioning state exceeds the time threshold is determined by the positioning tag 120. When the transmission number of the positioning signal PS does not exceed the number threshold and when the time that the positioning tag 120 is in the positioning state does not exceed the time threshold, the flow goes back to step S670 such that the positioning tag 120 keeps broadcasting the positioning signal PS in the assigned positioning time interval to perform positioning. When the transmission number of the positioning signal PS exceeds the number threshold or when the time that the positioning tag 120 is in the positioning state exceeds the time threshold, the flow goes back to step S610 such that the positioning tag 120 is set to be in the initializing state again to broadcast the connection request signal ER in the assigned positioning time interval, to determine whether the assigned positioning time interval can be further used.

Figure 7:
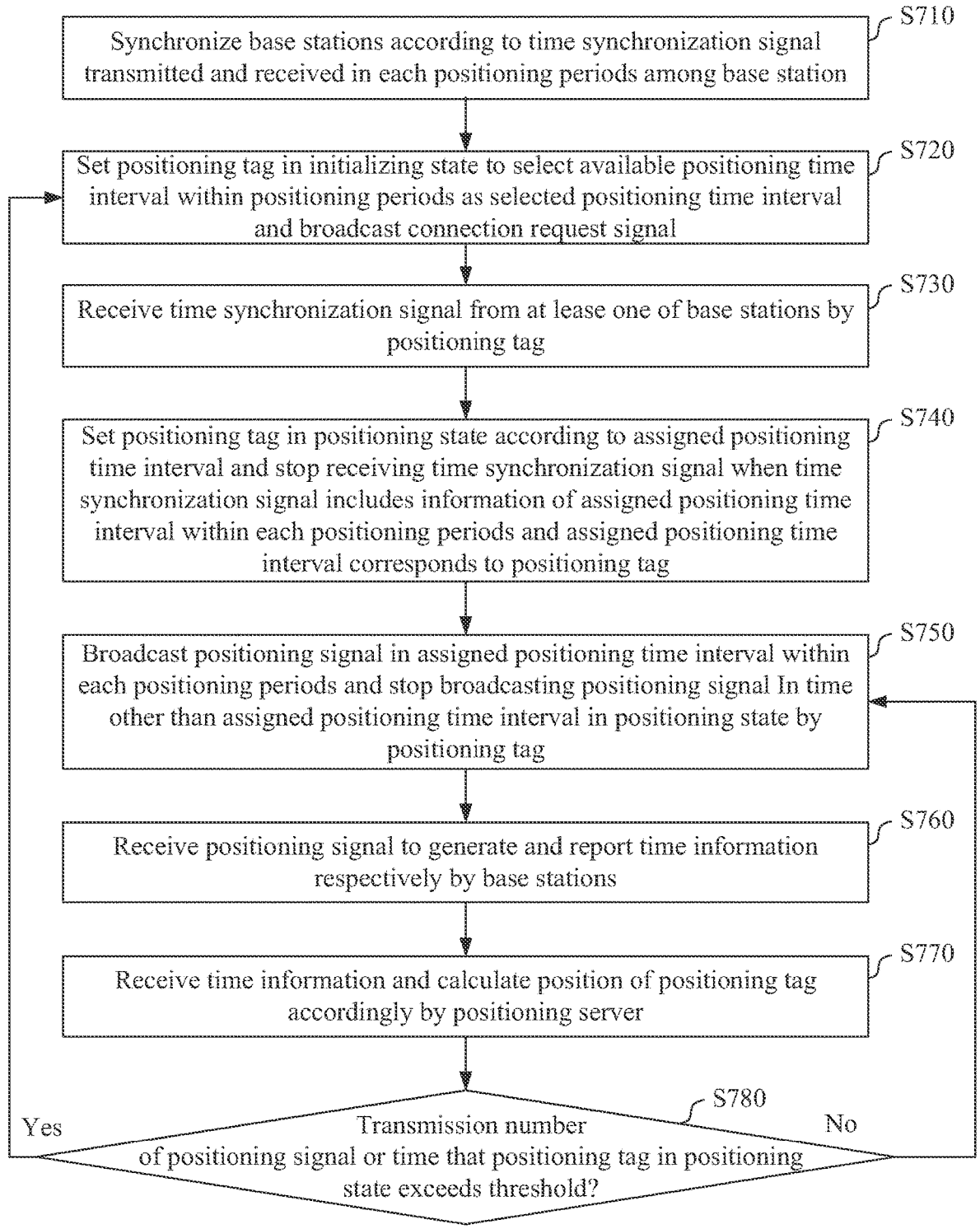
FIG. 7 illustrates a flow chart of a positioning system operation method according to an embodiment of the present invention.

FIG. 7 illustrates a flow chart of a positioning system operation method 700 according to an embodiment of the present invention. The positioning system operation method 700 can be used in such as the positioning system 100 in FIG. 1. The positioning system operation method 700 includes the steps outlined below.

In step S710, the base stations 110A~110F are synchronized according to the time synchronization signal CSF transmitted and received in each of the positioning periods among the base station 110A~110F.

In step S720, the positioning tag 120 is set in the initializing state, so as to select the available positioning time interval within each of the positioning periods as the selected positioning time interval and broadcast the connection request signal ER in the selected positioning time interval.

In step S730, the time synchronization signal CSF is received from at lease one of the base stations 110A~110F by the positioning tag 120.

In step S740, the time synchronization signal CSF includes the information of the assigned positioning time interval within each of the positioning periods and the assigned positioning time interval corresponds to the positioning tag are determined by the positioning tag 120, so as to set the positioning tag 120 in the positioning state according to the assigned positioning time interval and stop receiving the time synchronization signal CSF. In an embodiment, the positioning system operation method 700 can also perform detail determination and processing on the time synchronization signal CSF identical to steps S630~S650 in the positioning system operation method 600. The detail is not described herein.

In step S750, the positioning signal PS is broadcasted in the assigned positioning time interval within each of the positioning periods 200, and the positioning signal PS is stopped to be broadcasted in the time other than the assigned positioning time interval by the positioning tag 120 in the positioning state.

In step S760, the positioning signal PS is received by the base stations 110A~110F to generate and report the time information TSA~TSF respectively. It is appreciated that only the base stations that receive the positioning signal PS generate and report the time information.

In step S770, the time information TSA~TSF is received and the position of the positioning tag 120 is calculated accordingly by the positioning server 130. In an embodiment, the positioning server 130 calculates the position of the positioning tag 120 according to the time information TSA~TSF, the position information PO of the base stations 110A~110F and the time difference information TS among the base stations 110A~110F.

In step S780, whether the transmission number of the positioning signal PS exceeds the number threshold or whether the time that the positioning tag 120 is in the positioning state exceeds the time threshold is determined by the positioning tag 120. When the transmission number of the positioning signal PS does not exceed the number threshold and when the time that the positioning tag 120 is in the positioning state does not exceed the time threshold, the flow goes back to step S750 such that the positioning tag 120 keeps broadcasting the positioning signal PS in the assigned positioning time interval to perform positioning. When the transmission number of the positioning signal PS exceeds the number threshold or when the time that the positioning tag 120 is in the positioning state exceeds the time threshold, the flow goes back to step S720 such that the positioning tag 120 is set to be in the initializing state again.

Based on the above description, the positioning tag operation method and the positioning system operation method of the present invention allow the positioning tag to broadcast the connection request signal, and receive the time synchronization signal only in the initializing state. After the positioning tag connects to the positioning system according to the assigned positioning time interval included in the time synchronization signal, the positioning tag broadcasts the positioning signal and stops receiving the time synchronization signal in the positioning state to save power. Further, the positioning tag can be reset to the initializing state when the transmission number of the positioning signal exceeds the number threshold or when the time that the positioning tag is in the positioning state exceeds the time threshold. The conflict can be avoided.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A positioning tag operation method used in a positioning tag comprised in a positioning system, wherein the positioning system operates according to positioning periods, the positioning tag operation method comprising:
    setting the positioning tag in an initializing state, so as to select an available positioning time interval within each of the positioning periods as a selected positioning time interval and broadcast a connection request signal in the selected positioning time interval;
    receiving a time synchronization signal from at lease one base station of the positioning system by the positioning tag;
    determining that the time synchronization signal comprises information of an assigned positioning time interval within each of the positioning periods and the assigned positioning time interval corresponds to the positioning tag by the positioning tag, so as to set the positioning tag in a positioning state according to the assigned positioning time interval and stop receiving the time synchronization signal; and
    broadcasting a positioning signal in the assigned positioning time interval within each of the positioning periods by the positioning tag in the positioning state, and stopping broadcasting the positioning signal in the time other than the assigned positioning time interval within the positioning period.

2. The positioning tag operation method of claim 1, further comprising:
    setting the positioning tag in the initializing state when a transmission number of the positioning signal exceeds a number threshold or when a time that the positioning tag is in the positioning state exceeds a time threshold.

3. The positioning tag operation method of claim 1, further comprising:
    setting the positioning tag in the positioning state when the positioning tag determines that the time synchronization signal comprises device identification information of the positioning tag and the assigned positioning time interval corresponding to the device identification information, wherein the assigned positioning time interval is the same as the selected positioning time interval.

4. The positioning tag operation method of claim 3, wherein the positioning tag is reset to be in the initializing state to broadcast the connection request signal when the positioning tag begins to operate or when the positioning tag determines that the time synchronization signal does not comprise the device identification information corresponding to the positioning tag.

5. The positioning tag operation method of claim 3, further comprising:
selecting the assigned positioning time interval as the selected positioning time interval to broadcast the connection request signal again according to the selected positioning time interval by the positioning tag when the assigned positioning time interval is different from the selected positioning time interval.

6. A positioning system operation method used in a positioning system, wherein the positioning system operates according to positioning periods and comprises a plurality of base stations, a positioning tag and a positioning server, the positioning system operation method comprising:
synchronizing the base stations according to a time synchronization signal transmitted and received in each of the positioning periods among the base station;
setting the positioning tag in an initializing state, so as to select an available positioning time interval within each of the positioning periods as a selected positioning time interval and broadcast a connection request signal in the selected positioning time interval by the positioning tag;
receiving the time synchronization signal from at lease one of the base stations of the positioning system by the positioning tag;
determining that the time synchronization signal comprises information of an assigned positioning time interval within each of the positioning periods and the assigned positioning time interval corresponds to the positioning tag by the positioning tag, so as to set the positioning tag in a positioning state according to the assigned positioning time interval and stop receiving the time synchronization signal;
broadcasting a positioning signal in the assigned positioning time interval within each of the positioning periods, and stopping broadcasting the positioning signal in the time other than the assigned positioning time interval within each of the positioning periods by the positioning tag in the positioning state;
receiving the positioning signal by the base stations to generate time information respectively; and
receiving the time information and calculating a position of the positioning tag accordingly by the positioning server.

7. The positioning system operation method of claim 6, further comprising:
transmitting the time synchronization signal by a master base station of the base stations in a synchronizing time interval in each of the positioning periods;
receiving the time synchronization signal by a slave base station of the base stations to synchronize with the master base station according to the time synchronization signal.

8. The positioning system operation method of claim 6, further comprising:
setting the positioning tag in the initializing state when a transmission number of the positioning signal exceeds a number threshold or when a time that the positioning tag is in the positioning state exceeds a time threshold.

9. The positioning system operation method of claim 6, further comprising:
receiving the connection request signal, transferring the connection request signal to the positioning server to be processed, and generating the time synchronization signal in each of the positioning periods according to the processing of the positioning server by at least one of the base stations; and
setting the positioning tag in the positioning state when the positioning tag determines that the time synchronization signal comprises device identification information of the positioning tag and the assigned positioning time interval corresponding to the device identification information, wherein the assigned positioning time interval is the same as the selected positioning time interval.

10. The positioning system operation method of claim 8, further comprising:
selecting the assigned positioning time interval as the selected positioning time interval to broadcast the connection request signal again according to the selected positioning time interval by the positioning tag when the assigned positioning time interval is different from the selected positioning time interval.

* * * * *